(12) United States Patent
Hirata et al.

(10) Patent No.: US 11,789,536 B2
(45) Date of Patent: Oct. 17, 2023

(54) INPUT DEVICE AND DISPLAY INPUT SYSTEM

(71) Applicant: Nidec Corporation, Kyoto (JP)

(72) Inventors: Atsunori Hirata, Kyoto (JP); Tomohiro Hasegawa, Kyoto (JP); Daisuke Adachi, Kyoto (JP); Hiroaki Hirano, Kyoto (JP); Tomohiro Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/547,304

(22) Filed: Dec. 10, 2021

(65) Prior Publication Data

US 2022/0206580 A1 Jun. 30, 2022

(30) Foreign Application Priority Data

Dec. 28, 2020 (JP) ................................ 2020-219111

(51) Int. Cl.
| | | |
|---|---|---|
| *G06F 3/01* | (2006.01) | |
| *G06F 3/04842* | (2022.01) | |
| *G06F 3/04815* | (2022.01) | |
| *G06F 3/0346* | (2013.01) | |
| *H04N 13/332* | (2018.01) | |
| *G06F 3/0354* | (2013.01) | |

(52) U.S. Cl.
CPC ............ *G06F 3/016* (2013.01); *G06F 3/0346* (2013.01); *G06F 3/04815* (2013.01); *G06F 3/04842* (2013.01); *H04N 13/332* (2018.05); *G06F 3/03545* (2013.01)

(58) Field of Classification Search
CPC .... G06F 3/016; G06F 3/0346; G06F 3/04815; G06F 3/04842; G06F 3/03545; G06F 3/011; H04N 13/332
See application file for complete search history.

(56) References Cited

U.S. PATENT DOCUMENTS

| | | | | |
|---|---|---|---|---|
| 8,878,824 | B2 * | 11/2014 | Besperstov | ......... G06F 3/03545 |
| | | | | 345/179 |
| 9,239,639 | B1 * | 1/2016 | Vanderet | ............. G06F 3/03545 |
| 9,582,093 | B2 * | 2/2017 | Vandermeijden | ....... G06F 3/044 |
| 10,031,583 | B2 * | 7/2018 | Levesque | ................ G06F 3/041 |
| 10,048,778 | B2 * | 8/2018 | Mishalov | ................ G06F 3/033 |
| 10,423,246 | B2 * | 9/2019 | Kim | ......................... G06F 3/038 |
| 10,725,544 | B1 * | 7/2020 | Taylor | ...................... G06F 3/041 |
| 11,216,088 | B2 * | 1/2022 | Kaneda | .................. G06F 3/0442 |
| 11,301,061 | B2 * | 4/2022 | Kwon | ..................... G06F 3/017 |
| 11,507,189 | B1 * | 11/2022 | Goh | ..................... G06F 3/03545 |
| 11,526,218 | B2 * | 12/2022 | Kim | ...................... G06F 3/038 |
| 11,526,219 | B2 * | 12/2022 | Sung | .................. G06F 3/03545 |
| 11,526,240 | B1 * | 12/2022 | Bechstein | ............. H01L 29/872 |

(Continued)

FOREIGN PATENT DOCUMENTS

JP 2004-139411 A 5/2004

*Primary Examiner* — Benyam Ketema (74) *Attorney, Agent, or Firm* — KEATING & BENNETT (57) ABSTRACT

An input device includes a contact body to contact an object, a pressure sensor to detect pressure of contact of the contact body with the object, a vibrator to generate a vibration to provide a tactile sensation, and a vibration controller. The vibration of the vibrator when the pressure detected based on the output of the pressure sensor is large is larger than that when the pressure detected based on the output of the pressure sensor is small.

22 Claims, 7 Drawing Sheets

(56) References Cited

U.S. PATENT DOCUMENTS

| | | | | |
|---|---|---|---|---|
| 2002/0054060 A1* | 5/2002 | Schena | ............... | G06F 3/03543 715/701 |
| 2005/0015270 A1* | 1/2005 | Kato | ................... | G06V 30/412 345/179 |
| 2006/0158440 A1* | 7/2006 | Ashenbrenner | ......... | G06F 3/016 345/179 |
| 2008/0181501 A1* | 7/2008 | Faraboschi | ........... | G06F 40/226 382/179 |
| 2009/0135164 A1* | 5/2009 | Kyung | ................... | G06F 3/016 345/173 |
| 2009/0227296 A1* | 9/2009 | Kim | ....................... | G06F 3/016 455/566 |
| 2010/0160041 A1* | 6/2010 | Grant | ...................... | G06F 3/041 463/31 |
| 2011/0163991 A1* | 7/2011 | Tout | ........................ | G06F 3/016 345/174 |
| 2011/0241703 A1* | 10/2011 | Fukushima | ......... | G06F 3/03545 324/661 |
| 2012/0026180 A1* | 2/2012 | Kuchenbecker | ........ | G06F 3/016 345/582 |
| 2012/0127088 A1* | 5/2012 | Pance | ................ | G06F 3/04812 345/173 |
| 2013/0106720 A1* | 5/2013 | Shahparnia | ............... | G06F 1/26 345/173 |
| 2013/0106794 A1* | 5/2013 | Logan | ................. | G06F 3/03545 345/179 |
| 2013/0147748 A1* | 6/2013 | Westerinen | ............. | G06F 3/016 345/173 |
| 2013/0199311 A1* | 8/2013 | Horie | ..................... | G06F 3/046 73/862.626 |
| 2013/0307829 A1* | 11/2013 | Libin | ..................... | G06F 3/016 345/179 |
| 2013/0335380 A1* | 12/2013 | Griffin | ................ | G06F 3/03545 345/179 |
| 2014/0028592 A1* | 1/2014 | Wang | ................. | G06F 3/03545 345/173 |
| 2014/0055427 A1* | 2/2014 | Kim | ...................... | G06F 3/0488 345/179 |
| 2014/0253469 A1* | 9/2014 | Hicks | ................. | G06F 3/03545 345/173 |
| 2014/0340328 A1* | 11/2014 | Kameyama | ......... | G06F 3/03545 345/173 |
| 2015/0025883 A1* | 1/2015 | Koo | ........................ | G10L 15/22 704/235 |
| 2015/0035807 A1* | 2/2015 | Ito | ....................... | G06F 3/03545 345/179 |
| 2015/0070330 A1* | 3/2015 | Stern | ..................... | G06F 3/0442 345/179 |
| 2015/0116236 A1* | 4/2015 | Kim | ....................... | G06F 3/038 345/173 |
| 2015/0212578 A1* | 7/2015 | Lor | ..................... | G06F 3/03545 345/173 |
| 2015/0268725 A1* | 9/2015 | Levesque | ................ | G06F 3/041 345/156 |
| 2015/0302665 A1* | 10/2015 | Miller | ................ | G02B 27/0093 345/419 |
| 2015/0378456 A1* | 12/2015 | Ho | ....................... | G06F 3/03545 345/174 |
| 2016/0018912 A1* | 1/2016 | Kaneda | ................... | G06F 3/033 345/179 |
| 2016/0048221 A1* | 2/2016 | Boulanger | .......... | G06F 3/04883 345/173 |
| 2016/0162178 A1* | 6/2016 | Fukumura | ............. | G06F 3/0433 345/174 |
| 2016/0179222 A1* | 6/2016 | Chang | ................. | G06F 3/03545 345/179 |
| 2016/0188016 A1* | 6/2016 | Munakata | ............... | G06F 3/046 345/179 |
| 2016/0282970 A1* | 9/2016 | Evreinov | .............. | G06F 3/0383 |
| 2016/0334894 A1* | 11/2016 | Fujitsuka | .............. | G06F 3/0442 |
| 2017/0068342 A1* | 3/2017 | Zimmerman | ........ | G06F 3/04162 |
| 2017/0123519 A1* | 5/2017 | Reitan | .................... | G06F 3/0441 |
| 2017/0322665 A1* | 11/2017 | Shim | ..................... | G06F 3/0425 |
| 2017/0357338 A1* | 12/2017 | Bell | ..................... | G06F 3/04162 |
| 2017/0364167 A1* | 12/2017 | Ribeiro | ................. | G06F 3/0442 |
| 2017/0364238 A1* | 12/2017 | Kim | ..................... | G06F 3/0488 |
| 2017/0371434 A1* | 12/2017 | Kobori | .................... | G06F 3/046 |
| 2018/0024656 A1* | 1/2018 | Kim | ....................... | G06F 3/0383 345/174 |
| 2018/0046249 A1* | 2/2018 | Peretz | .................... | G06F 3/016 |
| 2018/0164908 A1* | 6/2018 | Tanaka | ................ | G06F 3/03545 |
| 2018/0181222 A1* | 6/2018 | Ivanov | ...................... | G01J 3/501 |
| 2018/0364821 A1* | 12/2018 | Kaneda | ................ | G06F 3/03545 |
| 2019/0056806 A1* | 2/2019 | Yeh | ....................... | G06F 3/0383 |
| 2019/0179431 A1* | 6/2019 | Klein | ................. | G06F 3/03545 |
| 2020/0033958 A1* | 1/2020 | Yamamoto | ........... | G06F 3/0338 |
| 2020/0174572 A1* | 6/2020 | Bergeron | ......... | G06F 3/03545 |
| 2020/0249775 A1* | 8/2020 | Ruscher | .................... | H02J 50/10 |
| 2021/0263613 A1* | 8/2021 | Hashimoto | ......... | G06F 3/03545 |
| 2021/0303087 A1* | 9/2021 | Vanka | .................... | G06F 3/0487 |
| 2021/0318766 A1* | 10/2021 | Ninomiya | ........... | G06F 3/03545 |

* cited by examiner

INPUT DEVICE AND DISPLAY INPUT SYSTEM

CROSS-REFERENCE TO RELATED APPLICATIONS

The present application claims priority under 35 U.S.C. § 119 to Japanese Patent Application No. 2020-219111, filed on Dec. 28, 2020, the entire contents of which are hereby incorporated herein by reference.

1. FIELD OF THE INVENTION

The present disclosure relates to an input device that changes an intensity of vibration based on an output of a sensor that detects an operation. The present disclosure also relates to a display input system including a video display device and an input device.

2. BACKGROUND

The setting and operation of equipment may be performed using an input device. Regarding a technique using a device for inputting characters, for example, the following device is known. Specifically, there is known a brush drawing device, as an example, that includes a tablet including a coordinate input face and a coordinate input unit that inputs coordinates to the coordinate input face, and performs drawing according to a trajectory of a drawing pattern that is a basic shape of drawing, wherein the brush drawing device includes a coordinate value detector that detects a coordinate value of the coordinates input by the coordinate input unit at predetermined time intervals, a pressure detector that detects pressure when the coordinate input unit inputs coordinates to the coordinate input face, an enlargement/reduction unit that enlarges or reduces a size of the drawing pattern according to the pressure detected by the pressure detector, a moving direction calculation unit that calculates a moving direction of the coordinate input unit based on the coordinate value sequentially detected by the coordinate value detector, a drawing pattern rotation unit that rotates a drawing pattern such that a pen tip portion of the drawing pattern is directed in a direction opposite to a moving direction calculated by the moving direction calculation unit, a distance interval calculation unit that calculates a distance interval between adjacent coordinate values sequentially detected by the coordinate value detector, a rotation control unit that controls the drawing pattern rotation unit based on the distance interval between the coordinate values calculated by the distance interval calculation unit to reduce a rotation amount of the drawing pattern, and a drawing unit that sequentially draws drawing patterns rotated by the drawing pattern rotation unit or the rotation control unit and enlarged or reduced by the enlargement/reduction unit at a coordinate position detected by the coordinate value detector. By using the tablet (pen tablet), it is possible to reproduce a natural brush drawing with a good texture.

Input and operation may be performed using a finger or a tool. For example, when writing characters on paper, a pen is used. When a finger or a tool is brought into contact with another object and moved, vibration is transmitted to the hand. For example, when a character is written on paper with a pen, vibration is transmitted from the pen to the hand. In addition, the magnitude of vibration transmitted to the hand varies depending on the contact pressure of the finger or the tool. In order to reproduce a tactile sensation (tactile feeling) when a finger or a tool is moved, it is necessary to consider strength of vibration.

SUMMARY

An example embodiment of an input device of the present disclosure includes a contact body to contact an object, a pressure sensor to detect a pressure of contact of the contact body to the object, a vibrator to generate a vibration to provide a tactile sensation, and a vibration controller to input a drive signal to the vibrator to operate the vibrator. The vibration of the vibrator when the pressure detected based on the output of the pressure sensor is large is larger than that when the pressure detected based on the output of the pressure sensor is small.

Another example embodiment of an input device of the present disclosure includes a vibrator to generate a vibration to provide a tactile sensation, and a vibration controller to input a drive signal to the vibrator to operate the vibrator. A vibration of the vibrator when a position relative to a stereoscopic display object displayed as a stereoscopic video in a real space is close, or a vibration of the vibrator when a position relative to a virtual object in a virtual reality space is close is larger than that when a position relative to the stereoscopic display object is far or that when a position relative to the virtual object in the virtual reality space is far.

In addition, an example embodiment of a display input system of the present disclosure includes a display device to display a stereoscopic video or a virtual reality video, an input device, and a detector to detect a position of the input device. The input device includes a vibrator to generate a vibration to provide a tactile sensation, and a vibration controller to input a drive signal to the vibrator to operate the vibrator. A vibration of the vibrator when a relative position between a stereoscopic display object displayed as the stereoscopic video in a real space and the input device is close, or a vibration of the vibrator when a relative position between a virtual object and the input device in a virtual reality space is close is larger than that when a relative position between the stereoscopic display object and the input device is far or that when a relative position between the virtual object and the input device in the virtual reality space is far.

The above and other elements, features, steps, characteristics and advantages of the present disclosure will become more apparent from the following detailed description of the example embodiments with reference to the attached drawings.

DETAILED DESCRIPTION

Hereinafter, examples of input devices and display input systems according to example embodiments of the present disclosure will be described with reference to FIGS. 1 to 8. Note that the scope of the present disclosure is not limited to the example embodiments described below, but includes any modification and combination thereof within the scope of the technical idea of the present disclosure.

Figure 1:
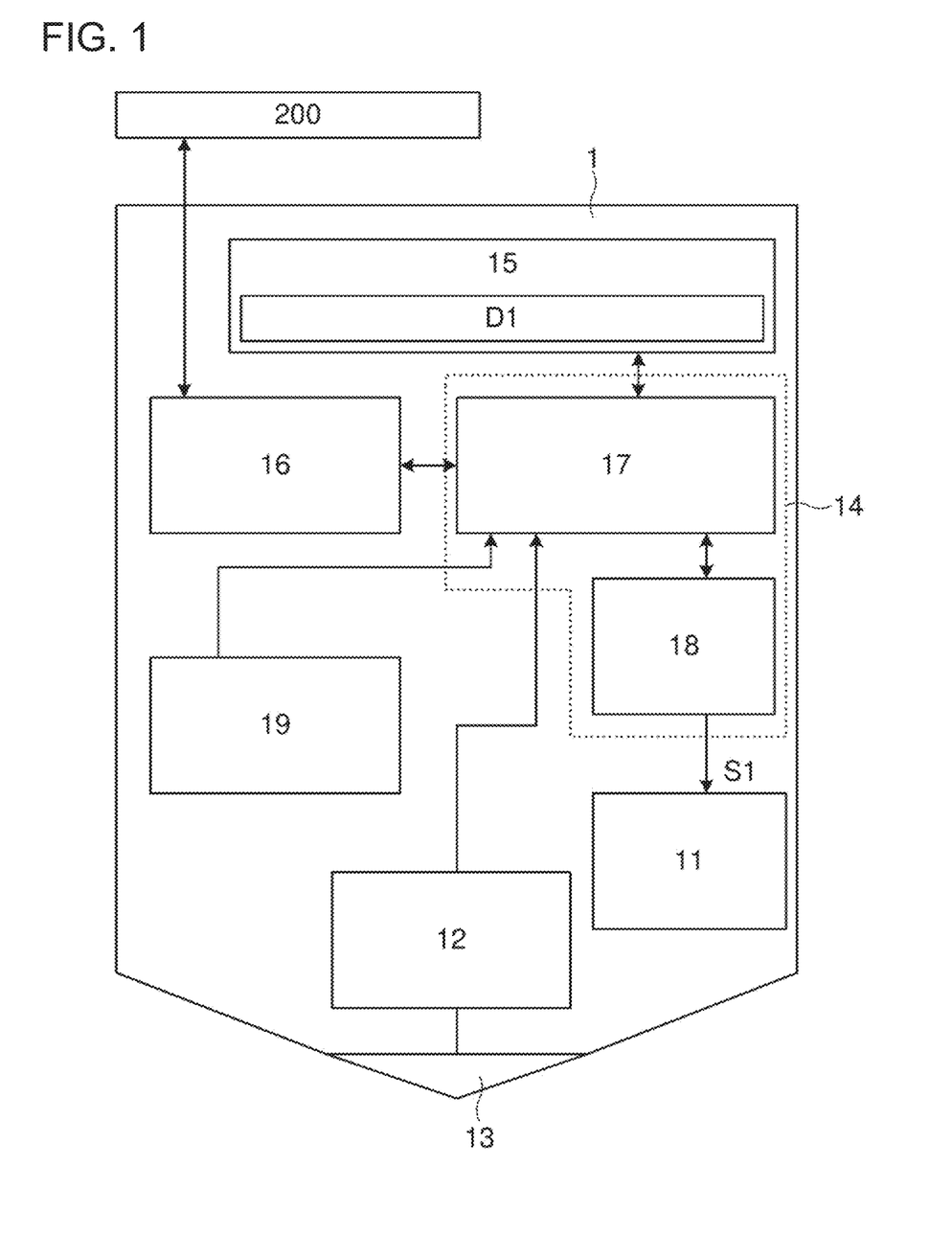
FIG. 1 is a diagram illustrating an example of an input device according to an example embodiment of the present disclosure.

FIG. 1 is a diagram illustrating an example of the input device 1 according to the example embodiment. The shape of the housing of the input device 1 may be an elongated shape. For example, the housing of the input device 1 may have the shape of a writing instrument (pen). In addition, the shape of the input device 1 may be a shape other than that of the writing instrument. For example, the input device 1 may be a pointing device such as a mouse. Furthermore, the input device 1 may be a device worn by a person (wearable device).

The input device 1 includes a vibrator 11, a pressure sensor 12, a contact body 13, a vibration controller 14, a storage 15, and a communication circuit unit 16 (selection receiver). The vibrator 11, the pressure sensor 12, the vibration controller 14, the storage 15, and the communication circuit unit 16 are housed in the housing of the input device 1. Although not illustrated, the input device 1 also includes a battery that supplies power to the vibrator 11, the pressure sensor 12, the vibration controller 14, the storage 15, and the communication circuit unit 16.

The vibrator 11 generates a vibration to provide a tactile sensation. That is, the vibrator 11 generates a vibration to provide a tactile sensation to the owner of the input device 1. For example, the vibrator 11 is a vibration motor. For example, the vibration motor may be a motor in which an eccentric weight is attached to a shaft. The vibrator 11 may be a device that includes a piezoelectric element and is deformed by voltage application to generate a vibration. The vibrator 11 may be a device (linear actuator) that reciprocates a weight in parallel.

The owner brings the contact body 13 of the input device 1 into contact with an object (object 2) to be brought into contact with. The contact body 13 is brought into contact with the object 2. When the input device 1 is of a pen type, for example, the contact body 13 is a pen tip. The owner brings the contact body 13 into contact with the object 2, and moves the input device 1 while keeping the contact body in contact with the object 2. Then, the pressure sensor 12 detects the pressure of the contact of the contact body 13 with the object 2. The pressure sensor 12 outputs a value (voltage value) corresponding to the force with which the contact body 13 pushes the object 2.

For example, the vibration controller 14 includes a controller 17 and a driver circuit 18. The vibration controller inputs a drive signal S1 to the vibrator 11 to operate the vibrator 11. The vibration controller 14 controls the magnitude of vibration. For example, the controller 17 is a microcomputer (microcontroller unit). The controller 17 recognizes the content of the input operation based on the output of the sensor included in the input device 1. For example, the output of the pressure sensor 12 is input to the controller 17. Based on the input output value of the output of the pressure sensor 12, the controller 17 obtains the pressure at which the contact body 13 pushes the object 2. The controller 17 gives an instruction to turn on/off the vibrator 11 to the driver circuit 18. At the time of the ON instruction, the driver circuit 18 generates the drive signal S1 and inputs the drive signal S1 to the vibrator 11. As a result, the vibrator 11 generates a vibration.

For example, the storage 15 is a semiconductor memory. The storage 15 stores data in a nonvolatile manner. The storage 15 stores the magnitude of the vibration when the contact body 13 and the object 2 come into contact with each other. In other words, the storage 15 stores data (vibration pattern data D1) defining the magnitude of the vibration when coming into contact with the object 2. Then, the magnitude of the vibration of the vibrator 11 changes according to the output value of the pressure sensor 12 based on the data stored in the storage 15, that is, the vibration controller 14 refers to the vibration pattern data D1 and vibrates the vibrator 11 with the magnitude according to the detected pressure. As a result, when the input device 1 is moved (input operation is performed), the magnitude of the vibration can be determined based on the output value of the pressure sensor 12. Then, the tactile sensation in accordance with the pressure of the input device 1 is provided to the operator. Furthermore, it is possible to provide the operator with a tactile sensation when using a finger or when using a tool. In addition, it is also possible to provide the operator with a tactile sensation as if the input device 1 has been brought into contact with an object (material) different from the object 2.

The communication circuit unit 16 includes, for example, a radio communication control circuit, a communication memory, and an antenna. The communication memory stores communication software. For example, the communication circuit unit 16 communicates with a computer 200. The computer 200 may be a PC, a smartphone, or a tablet terminal.

Further, the input device 1 may house a movement sensor 19. The movement sensor 19 is a sensor that detects a motion of the owner of the input device 1. For example, the movement sensor is a nine-axis sensor. The nine-axis sensor is a sensor including a three-axis acceleration sensor, a three-axis angular velocity sensor (gyro sensor), and a three-axis orientation sensor (magnetic compass sensor). The acceleration sensor is a sensor that measures the acceleration of the input device 1. The acceleration sensor detects movement of the input device 1 in three orthogonal axes (three dimensions). The output of the acceleration sensor is input to the controller 17. The angular velocity sensor is a sensor that measures a rotation angle per unit time of the input device 1. The output of the angular velocity sensor is input to the controller 17. The orientation sensor is a sensor that detects geomagnetism and measures the orientation of the input device 1. The controller 17 performs calculation based on outputs of the acceleration sensor, the angular velocity sensor, and the orientation sensor. For example, the controller 17 obtains an inclination, a moving direction, a moving speed, and a moving amount of the input device 1.

Figure 2:
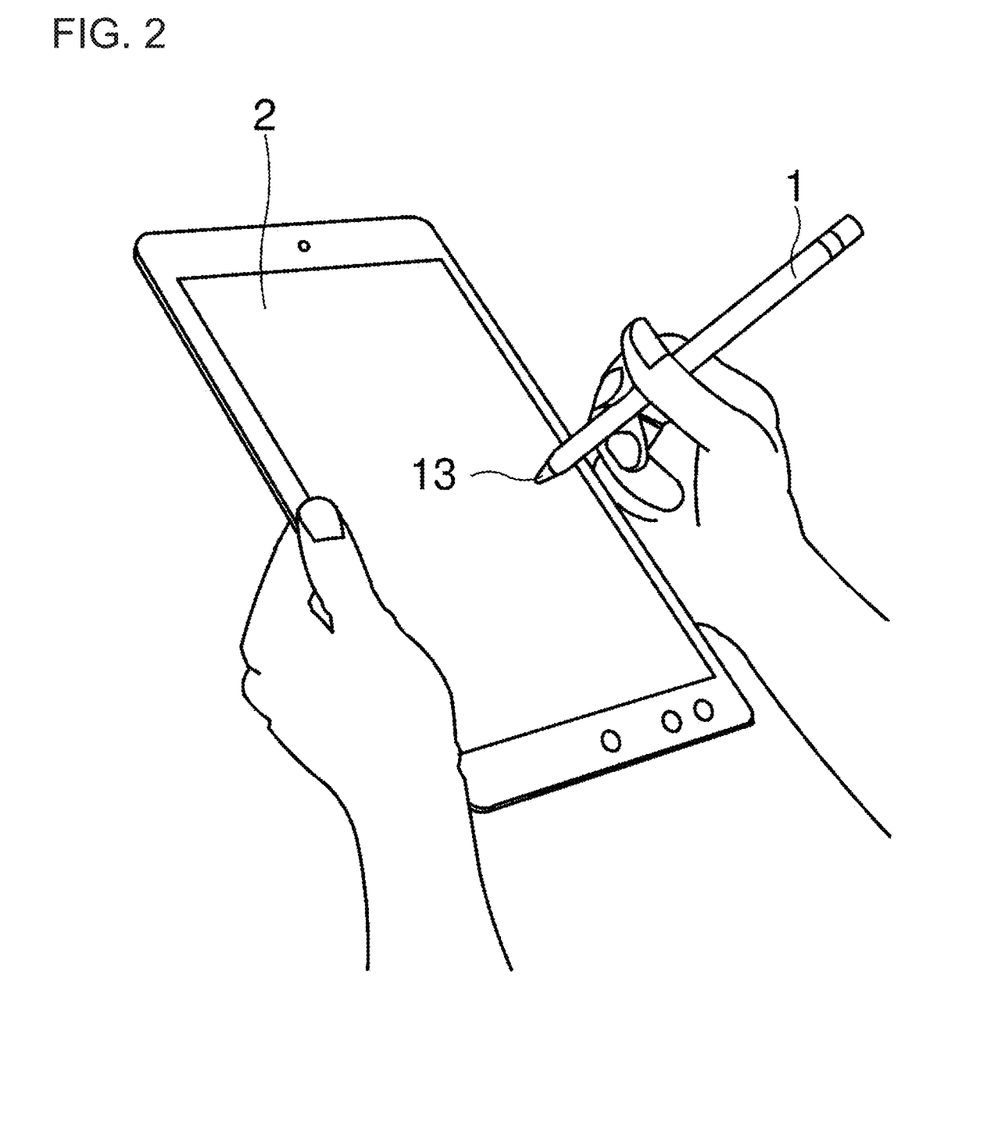
FIG. 2 is a diagram illustrating an aspect of a first usage example of an input device according to an example embodiment of the present disclosure.

Next, a first usage example of the input device 1 will be described. As the first usage example, use of bringing the input device 1 into contact with the object 2 will be described. The object 2 has a substance and is an object with which the input device 1 is brought into contact. FIG. 2 is a diagram illustrating an aspect of the first usage example of the input device 1 according to the example embodiment. FIG. 2 illustrates an example in which the input device 1 is a pen type, and the object 2 is a tablet terminal (display surface).

First, the input device 1 can be set. For example, the setting can be performed using the computer 200. For example, an application for setting the input device 1 is installed in the computer 200. The operator of the input device 1 operates the computer 200 to set the input device 1.

Using the computer 200, it is possible to select a type of the object (type of the object 2, material), which is classified by the characteristic of the object 2. For example, the type of the object 2 can be selected from a plurality of predetermined candidates. The type such as ceramic, glass, rubber, ice, stone, or wood may be selected. In addition, the type of the object 2 may be selectable from a plurality of kinds of metals such as iron and aluminum. In addition, the type of the object 2 may be selectable from a plurality of kinds of cloths such as silk and cotton. In addition, the type of the object 2 may be selectable from a plurality of kinds of paper such as plain paper, Japanese paper, and cardboard. In addition, the type of the object 2 may be selectable from a plurality of kinds of resins. In addition, the type of the object 2 may be selectable from names of objects such as notes and books. The computer 200 transmits data indicating the type of the object 2 selected by the operator to the communication circuit unit 16. The communication circuit unit 16 of the input device 1 receives data indicating the type of the selected object 2. In this manner, what kind of object is to be brought into contact with the input device 1 can be set.

The computer 200 can be used to select whether the input device 1 is regarded as a finger or what kind of tool the input device 1 is regarded as (handled as). The kind of a finger or a tool can be selected from the predetermined candidates. The kind of the finger may be selected from a plurality of kinds. As the kind of the finger, a finger on which a wearable device is worn may be selected. As the kind of finger, a finger around which a tape is wound may be selected. A finger may be selected from five fingers such as a thumb, an index finger, a middle finger, a ring finger, and a little finger. Note that only one kind of the finger may be selectable. A tool may be selected from a plurality of writing instruments such as a pen, a brush, and a pencil. A tool such as scissors or a cutter may be selectable. The computer 200 transmits data indicating the kind of the finger or the tool selected by the operator to the communication circuit unit 16. The communication circuit unit 16 of the input device 1 receives data indicating the kind of the finger or the tool selected. In this manner, the kind of the finger or the tool to be input (operated) to the display object can be set. In other words, it is possible to perform setting so as to cause the input device 1 to reproduce a tactile sensation in which what kind of finger is brought into contact with the object 2 can be recognized, or to cause the input device 1 to reproduce a tactile sensation in which what kind of tool is brought into contact with the object 2 can be recognized.

Figure 3:
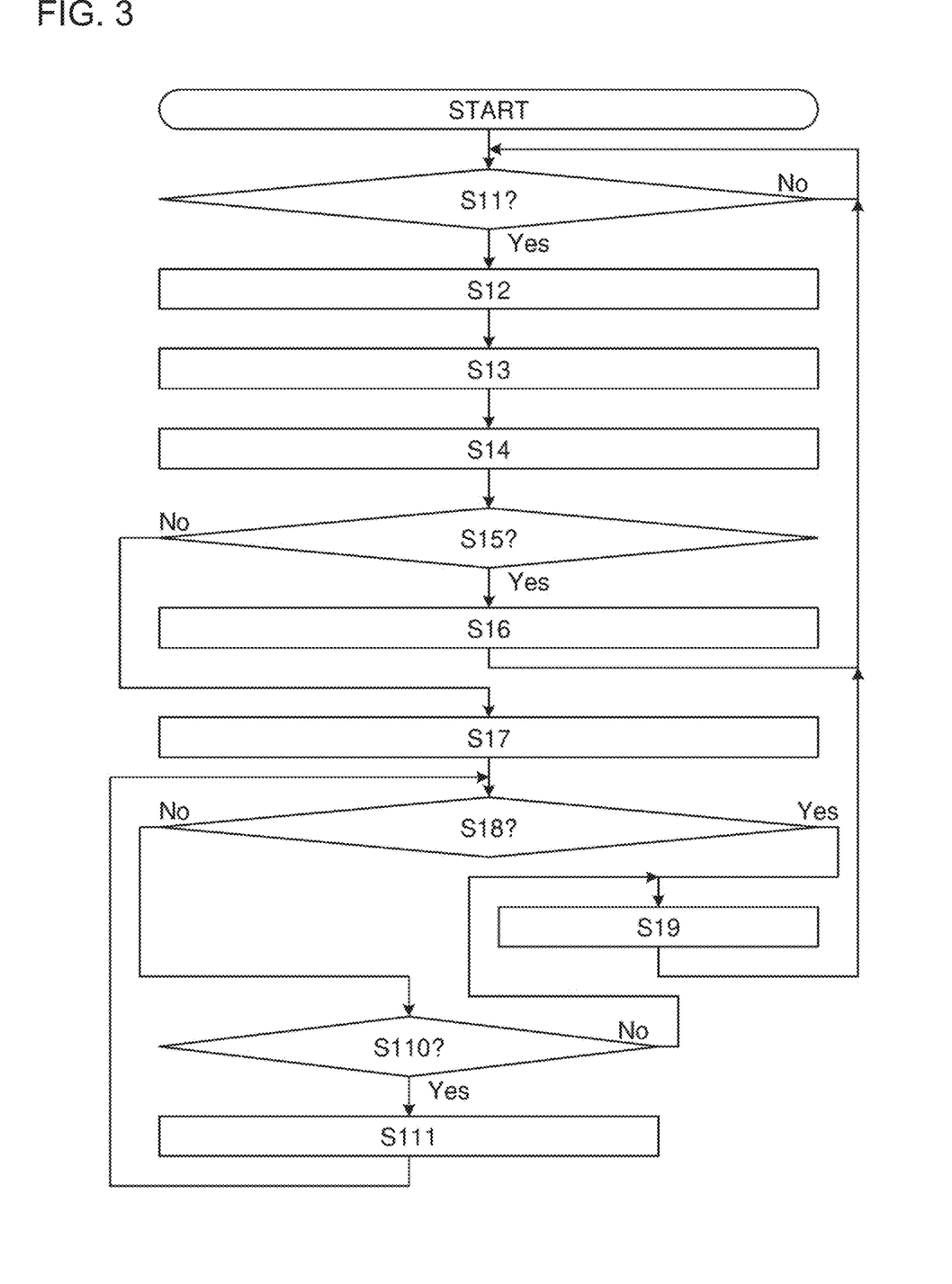
FIG. 3 is a diagram illustrating an example of a flow of operation when an input device according to an example embodiment of the present disclosure is brought into contact with an object.

FIG. 3 is a diagram illustrating an example of a flow of operation when the input device 1 according to the example embodiment is brought into contact with the object 2.

First, the storage 15 stores the vibration pattern data D1. The vibration pattern data D1 may be data indicating a pattern of vibration generated in the vibrator 11 for a predetermined time. The storage 15 stores the vibration pattern data D1 for each combination of the type of the object 2 and the kind of the finger or the tool. In other words, even with the same finger or the same tool, the vibration pattern data D1 is determined for each type of the object 2. For example, even with the same finger or the same tool, the vibration pattern data D1 of glass are different from the vibration pattern data D1 of paper. Furthermore, even when the type of the object 2 is the same, the vibration pattern data D1 is determined for each kind of finger or each kind of tool. For example, even when the type of the object 2 is the same, the vibration pattern data D1 of the pen is different from the vibration pattern data D1 of the cutter.

For example, the vibration when the object 2 is traced is measured for each kind of finger or tool and for each type of the object 2. The measured vibration or the vibration pattern approximate to the measured vibration may be stored as the vibration pattern for each combination of the kind of the finger or the tool and the type of the object 2. The controller 17 of the vibration controller 14 reads, from the storage 15, the vibration pattern data D1 corresponding to the kind of the finger or the tool selected and the type of the object 2. The driver circuit 18 may vibrate the vibrator 11 so that the vibration of the read vibration pattern data D1 is reproduced. In this case, the driver circuit 18 reproduces the vibration pattern included in the vibration pattern data D1. For example, the driver circuit 18 varies the interval and frequency of the vibration generated by the vibrator 11 for each combination of the kind of the finger or the tool and the type of the object 2.

The vibration pattern data D1 may be data defining a pattern (waveform) of the drive signal S1 for a predetermined time. The storage 15 may store patterns of the different drive signals S1 for each combination of the type of the object 2 and the kind of the finger or the kind of the tool. For example, the pattern of the drive signal S1 is determined, in advance, so as to approximate the vibration received by the hand when the selected object 2 is traced with the finger or the tool selected. The amplitude of the drive signal S1, the timing of turning ON/OFF the voltage to the vibrator 11, the pulse width of the voltage application of the vibrator 11, and the like may be determined, in advance, for each combination of the type of the object 2 and the kind of the finger or the tool. The controller 17 of the vibration controller 14 reads, from the storage 15, the vibration pattern data D1 corresponding to the kind of the finger or the tool selected and the type of the object 2. The driver circuit 18 generates a drive signal S1 based on the read vibration pattern data D1. The vibration received by the hand when the selected object 2 is traced with the finger or the tool selected can be reproduced.

Furthermore, in the combination of the one kind of the finger or the tool and the type of the object 2, different vibration pattern data D1 may be determined for each level (stage) of the magnitude (strength) of vibration. The vibration pattern data D1 may be determined such that the vibration is larger as the level is higher (larger) while reproducing the vibration. That is, a plurality of pieces of vibration pattern data D1 having different magnitudes of vibration may be determined in a combination of one kind of the finger or the tool and the type of the object 2. For example, when the magnitude of vibration has 10 levels, 10 kinds of vibration pattern data D1 may be determined in a combination of the one kind of the finger or the tool and the type of the object 2. The number of levels may be larger or smaller than 10 levels.

The start of FIG. 3 is a time point when the operation of the input device 1 is started. The input device 1 may be provided with a switch for performing ON/OFF. The computer 200 may be operated to switch ON/OFF of the input device 1.

First, based on the output of the pressure sensor 12, the controller 17 determines whether the contact body 13 and the object 2 are in contact with each other (step S11). For example, when the pressure detected based on the output of the pressure sensor 12 is 0 or a predetermined reference value or less, the controller 17 may determine that the contact body 13 is not in contact with the object 2 (No in step S11). In this case, the controller 17 executes step S11 again.

On the other hand, when the detected pressure is greater than 0 or exceeds a predetermined reference value, the controller 17 determines that the contact body 13 is in contact with the object 2 (Yes in step S11). At this time, based on the output of the pressure sensor 12, the controller 17 obtains the magnitude of the pressure of the contact of the contact body 13 with the object 2 (step S12). Then, based on the magnitude of the contact pressure, the controller 17 determines the level of the intensity of vibration (step S13). For each level, a corresponding pressure range is predetermined. The controller 17 may select a level at which the vibration is larger as the pressure detected based on the output of the pressure sensor 12 is larger. Then, the controller 17 reads, from the storage 15, the vibration pattern data D1 with the vibration level determined, corresponding to the kind of the finger or the tool selected, and corresponding to the object 2 (step S14).

Next, based on the output of the movement sensor 19, the controller 17 determines whether the input device 1 is stationary (step S15). For example, when the movement amount of the movement sensor 19 per unit time is equal to or less than a predetermined threshold value, the controller 17 determines that the input device 1 is stationary. When the movement amount of the movement sensor 19 per unit time exceeds the threshold value, the controller 17 determines that the input device 1 is not stationary. Note that whether the input device 1 is stationary may be determined by a way other than the movement sensor 19. For example, the object 2 may determine the movement of the input device 1 based on the movement information of the input device 1. For example, when the object 2 is a display, the display may recognize the trajectory of the input device 1 and determine the movement of the input device 1 based on the trajectory.

When it is determined that the input device 1 is stationary (Yes in step S15), the controller 17 and the driver circuit 18 do not vibrate the vibrator 11 (step S16). Then, the controller 17 executes step S11. As described above, the input device 1 includes the movement sensor 19 that detects the movement of the input device 1. Then, the vibrator 11 may be prevented from vibrating while the input device 1 is stationary. As a result, the input device 1 does not vibrate when the input device 1 is not moved. While the operator stops the operation, the vibration also stops. For example, in a state where the line is not drawn, the vibration stops. On the other hand, when determining that the input device 1 is not stationary (moving) (No in step S15), the controller 17 and the driver circuit 18 vibrate the vibrator 11 based on the read vibration pattern data D1 (step S17).

As a result, the vibration controller 14 causes the vibrator 11 to generate a larger vibration as the pressure detected by the pressure sensor 12 is larger. That is, the vibration of the vibrator 11 when the pressure detected based on the output of the pressure sensor 12 is large is larger than that when the pressure detected based on the output of the pressure sensor 12 is small, whereby the vibration of the vibrator 11 is increased or decreased according to the pressure when the input device 1 comes into contact with the object 2. Therefore, different tactile sensations can be provided to the operator according to the contact pressure of the input device 1. That is, it is possible to provide the input device 1 that not only simply vibrates but also provides various tactile sensations depending on the way of handling. In this regard, in the case of strongly tracing and in the case of weakly tracing, the vibration received in the case of strongly tracing may be larger. For example, in the case of using a pen, the vibration returned to the hand is often larger as the writing pressure is higher. Therefore, it is possible to emphasize the tactile sensation when the input device 1 is brought into contact with the object 2.

Here, even when the detected pressure and the kind of the finger or the kind of the tool selected are the same, the vibration pattern data D1 varies depending on the kind of the selected object 2. Therefore, the vibration of the vibrator 11 varies depending on the type of the object 2, which is classified by the characteristic of the object 2. Thus, the vibration pattern can be changed according to the type of the object 2. For example, the manner of the vibration of the input device 1 changes between when the input device 1 is in contact with cloth and when the input device 1 is in contact with paper. Therefore, vibration in accordance with the type and material of the object 2 can be generated. Furthermore, the input device 1 includes a selection receiver that receives selection of the type of the object 2. The selection receiver is, for example, the communication circuit unit 16. The vibration controller 14 causes the vibrator 11 to vibrate differently according to the type of the selected object 2. That is, the vibration of the vibrator 11 varies depending on the type of the selected object 2. The operator of the input device 1 can select the type of the object 2. As a result, it is possible to generate a vibration suitable for the contacted object 2. That is, it is possible to generate a vibration similar to that when the object 2 is brought into contact and traced.

For example, when the surface of the display of the tablet terminal illustrated in FIG. 2 is glass, the input device 1 (vibrator 11) may generate a vibration that reproduces vibration when the glass is traced. In addition, when the display of the tablet terminal displays paper, the input device 1 (vibrator 11) may generate a vibration that reproduces a vibration when the paper is traced.

Specifically, the frequency of a vibration of the vibrator 11 may vary depending on the type of object 2 selected. The vibration pattern data D1 may be data having a different vibration frequency depending on the type of the selected object 2. The frequency of the vibration when tracing an object having a smooth surface is lower than the frequency of the vibration when tracing an object having a rough surface. The frequency of the vibration of the input device 1 may change according to the smoothness of the surface of the object 2.

Furthermore, even when the detected pressure and the kind of the selected object 2 are the same, the vibration pattern data D1 varies depending on the kind of the finger or the tool selected. Therefore, the vibration of the vibrator 11 varies depending on the kind of the finger or the tool. As a result, the vibration according to the kind of the finger or the tool can be generated. Therefore, when the input device 1 is used, it is possible to obtain a tactile sensation as if a finger or a tool traces the object 2. Furthermore, the selection receiver (communication circuit unit 16) of the input device 1 receives selection of the kind of the finger or the tool. The vibration controller 14 causes the vibrator 11 to vibrate differently according to the kind of the finger or the tool selected. That is, the vibration of the vibrator 11 varies depending on the kind of the finger or the tool selected. Moreover, the operator of the input device 1 can select which finger or which tool the input device 1 is regarded as. Then, with the vibration of the input device 1, it is possible to obtain a tactile sensation as if the selected finger or the selected tool is used. For example, when the input device 1 is regarded as a pencil, the vibrator 11 may generate a vibration that reproduces the vibration received by the hand from the pencil.

After the start of the vibration, the controller 17 determines whether the input device 1 is stationary based on the output of the movement sensor 19 (step S18). When it is determined that the input device 1 is stationary (Yes in step S18), the controller 17 and the driver circuit 18 stop the vibration of the vibrator 11 (step S19). Then, the controller 17 performs step S11. Note that whether the input device 1 is stationary may be determined by a sensor other than the movement sensor. As described in paragraph 0032, for example, the object 2 may determine the movement of the input device 1.

When the input device 1 is not stationary (moving) (No in step S18), the controller 17 determines whether the contact body 13 and the object 2 are in contact with each other based on the output of the pressure sensor 12 (step S110). When it is determined that there is no contact (No in step S110), the controller 17 and the driver circuit 18 stop the vibration of the vibrator 11 (step S19). Then, the controller 17 performs step S11. When it is determined that they are in contact with each other (Yes in step S110), the controller 17 and the driver circuit 18 continue the vibration of the vibrator 11 (step S111). Then, the controller 17 performs the process of step S18.

The input device 1 includes the movement sensor 19 that detects the movement of the input device 1. Then, the vibrator 11 may keep the frequency of the vibration constant even when the moving speed changes during the movement of the input device 1. In other words, the vibration controller 14 may vibrate the vibrator 11 at a constant frequency even when the moving speed changes during the movement of the input device 1. Vibration control of the input device 1 is facilitated. The vibration controller 14 may not be a complicated circuit. A tactile effect can be obtained even with a simple configuration.

Furthermore, when the pressure detected based on the pressure sensor 12 changes while the vibrator 11 vibrates, the vibrator 11 may change the magnitude (stage) of vibration. In other words, when the pressure changes, the vibration controller 14 may change the magnitude of the vibration of the vibrator 11. For example, the controller 17 selects new vibration pattern data D1 based on the changed pressure.

Figure 4:
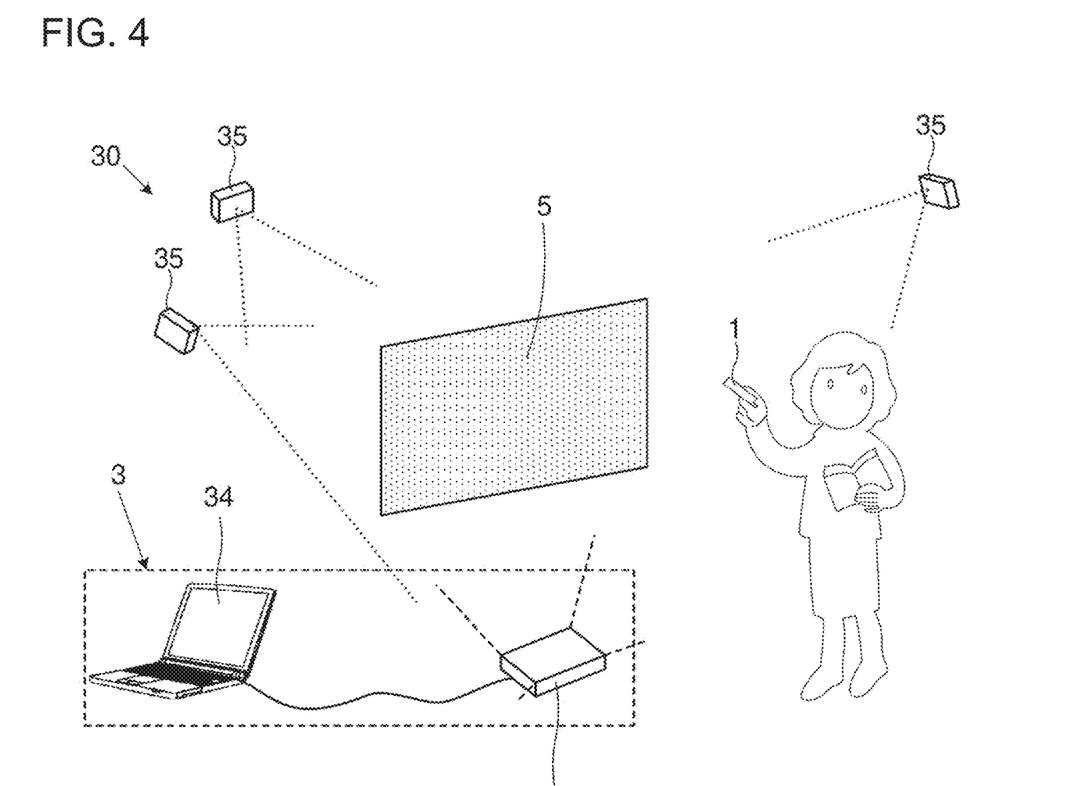
FIG. 4 is a diagram illustrating an example of a display input system including a display device that displays a stereoscopic video and an input device according to an example embodiment of the present disclosure.
Figure 5:
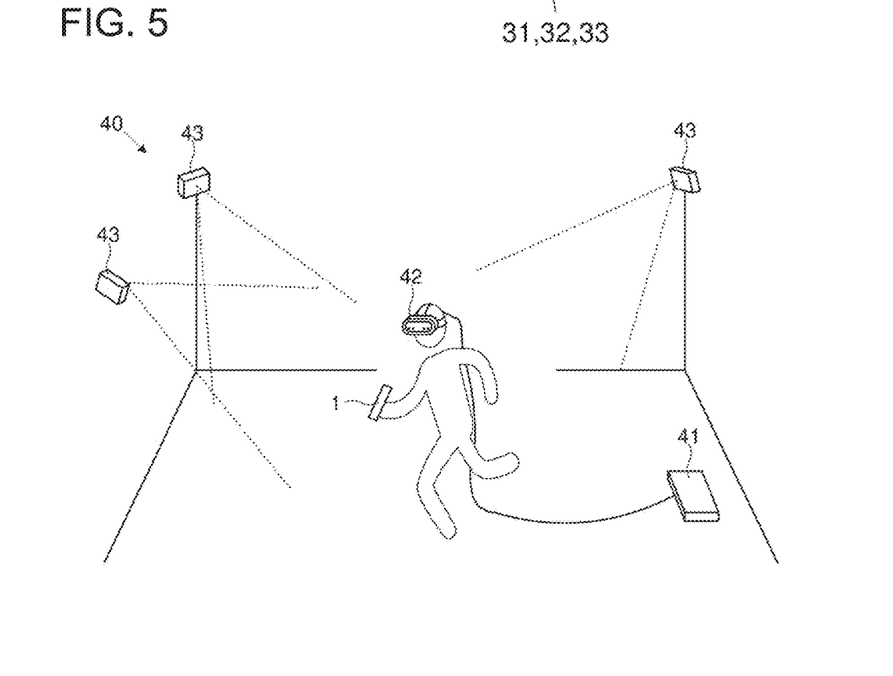
FIG. 5 is a diagram illustrating an example of a display input system including a display device that displays a virtual reality video and an input device according to an example embodiment of the present disclosure.

Next, a second usage example of the input device 1 will be described. As the second usage example, the input device 1 used for inputting to a display object having no substance will be described. Furthermore, as the second usage example, a display input system including a display device that displays a stereoscopic video or displays a virtual reality video, the input device 1, and a detector that detects the position of the input device 1 will be described. FIGS. 4 and 5 illustrate the second usage example of the input device 1 according to the example embodiment. FIG. 4 illustrates an example of a display input system including a display device that displays a stereoscopic video and an input device 1. FIG. 5 illustrates an example of a display input system including a display device (head mounted display) that displays a virtual reality video and the input device 1. The display device combined with the input device 1 may be a display device that displays a stereoscopic video in a real space or a display device that displays a virtual reality video.

In the following description, a display device that displays a stereoscopic video is referred to as a stereoscopic video display device 3. A display input system including the stereoscopic video display device 3 and the input device 1 is referred to as a stereoscopic video display input system 30. A display device that displays a virtual reality video is referred to as a virtual reality video display device 4. A display input system including the virtual reality video display device 4 and the input device 1 is referred to as a virtual reality video display input system 40. In the stereoscopic video displayed by the stereoscopic video display device 3, the displayed object is referred to as a stereoscopic display object 5. A virtual object (object) displayed by the virtual reality video display device 4, disposed in the virtual reality space, and displayed on the virtual reality video is referred to as a virtual object. Further, hereinafter, the stereoscopic display object 5 and the virtual object may be collectively referred to as a display object.

Note that the input device 1 in the second usage example (display input system) may be the same as the input device 1 described in the first usage example. On the other hand, the display object is not an actual object. Therefore, the input device 1 in the second usage example (display input system) may not include the pressure sensor 12 and the contact body 13.

Figure 6:
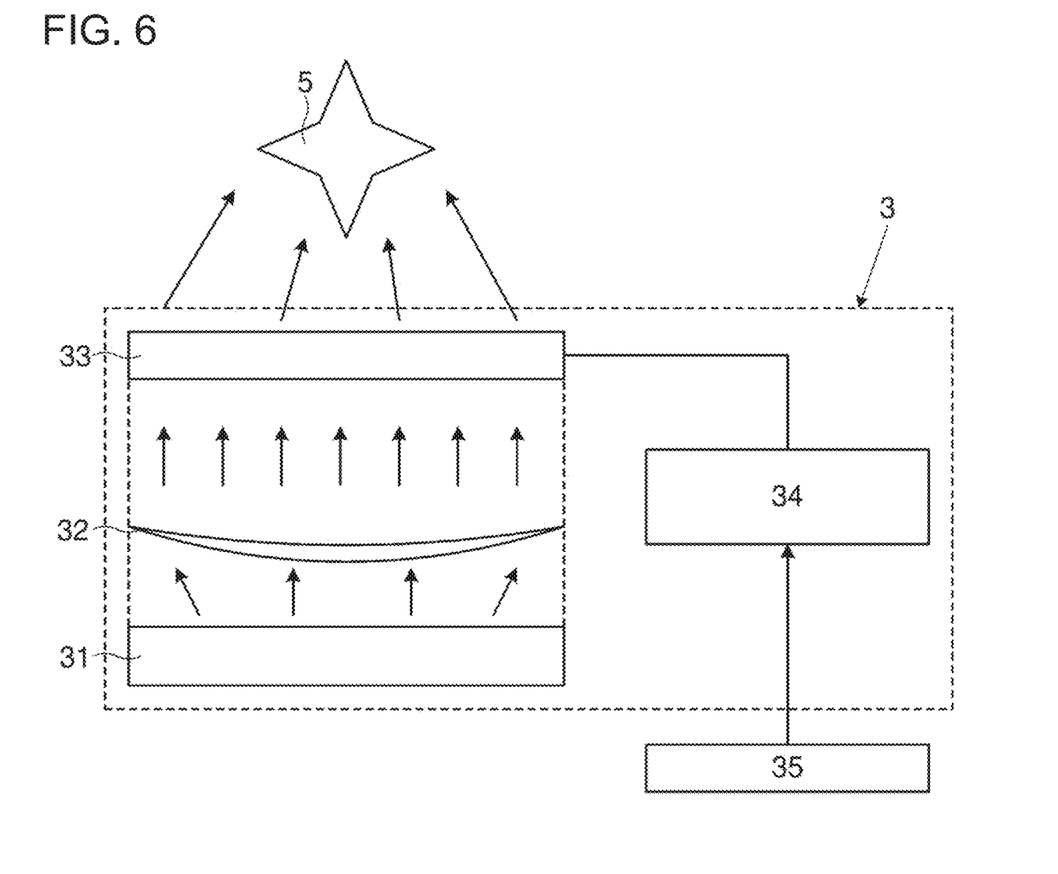
FIG. 6 is a view illustrating an example of a stereoscopic video display device according to an example embodiment of the present disclosure.

FIG. 6 is a diagram illustrating an example of the stereoscopic video display device 3 according to the example embodiment. The stereoscopic video display device 3 includes a light source 31, a lens 32, a phase modulation device 33, and an information processing device 34. The stereoscopic video display input system 30 includes the input device 1, the stereoscopic video display device 3, and a detector 35. The information processing device 34 is, for example, a PC and includes a processor.

The light source 31 is the light source 31 for displaying a stereoscopic video (stereoscopic display object 5). As the light source 31, a laser light irradiation device or an LED can be used. The plurality of light sources 31 may be used. For example, the stereoscopic video display device 3 may include the light sources 31 for each color of R, G, and B. The lens 32 collimates the light emitted from the light source 31. The phase modulation device 33 diffracts light from the light source 31 to display the stereoscopic display object 5. When the phase modulation device 33 diffracts the light from the light source 31, the stereoscopic display object 5 is displayed in the space opposite to the light incident face. The information processing device 34 generates hologram data and gives the generated hologram data to the phase modulation device 33. The phase modulation device 33 diffracts light based on the given hologram data and reproduces the stereoscopic display object 5 based on the hologram data. For example, when hologram data for reproducing a star is transmitted to the phase modulation device 33, the star is displayed as the stereoscopic display object 5 (hologram image).

As illustrated in FIG. 4, the stereoscopic video display device 3 may include a plurality of cameras as the detector 35. For example, the camera is provided around the stereoscopic video display device 3. Imaging data obtained by photographing by each camera may be transmitted to the information processing device 34. The information processing device 34 may calculate and identify the positions (coordinates) of the stereoscopic display object 5 and the input device 1 in the real space based on the parallax of the subject appearing in the imaging data obtained by photographing by each camera. Furthermore, the information processing device 34 may communicate with the communication circuit unit 16 of the input device 1. For example, the communication circuit unit 16 of the input device 1 may transmit the output value of the movement sensor 19 to the information processing device 34. As a result, the information processing device 34 may obtain the position of the input device 1 after the movement. The detector 35 may be the same device as the stereoscopic video display device 3. For example, the detector 35 may be attached to the information processing device 34. Since the detector 35 is integrated with the stereoscopic video display device 3, the configuration of the display device is simplified. Note that detector 35 may be a device other than the camera, such as an infrared sensor. For example, the detector 35 may be a LiDAR or a ToF sensor (an infrared laser beam and a camera).

Figure 7:
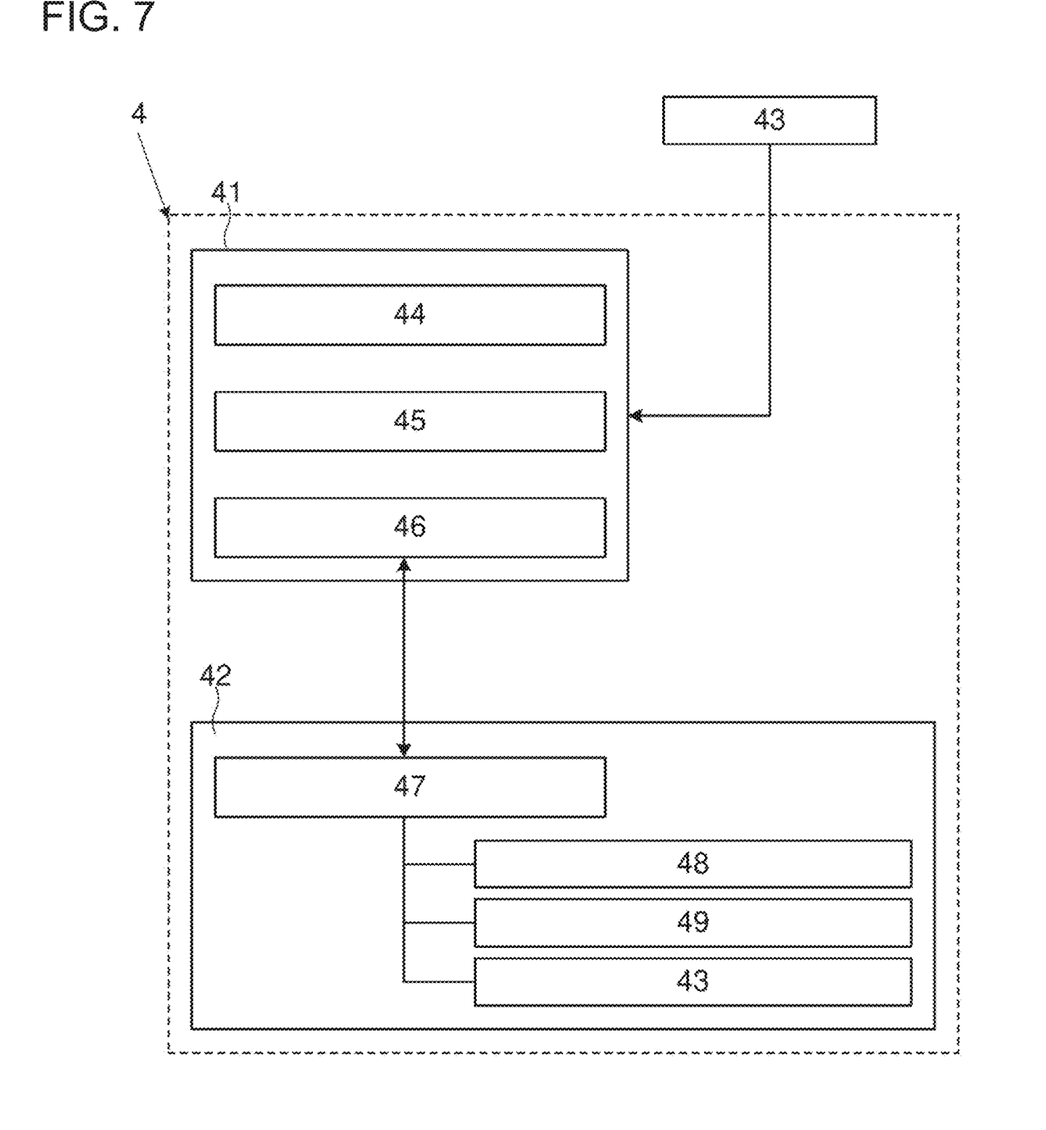
FIG. 7 is a diagram illustrating an example of a virtual reality video display device according to an example embodiment of the present disclosure.

FIG. 7 is a diagram illustrating an example of the virtual reality video display device 4 according to the example embodiment. First, the virtual reality video display device 4 includes an information processing device 41 and a mounting unit 42. The virtual reality video display input system 40 includes the input device 1, the virtual reality video display device 4, and a detector 43. The information processing device 41 is, for example, a PC and includes a processor. The information processing device 41 is a device that supplies data of a video to be displayed on the mounting unit 42. For example, the information processing device 41 supplies data of a video for the left eye and data of a video for the right eye. As illustrated in FIG. 7, the information processing device 41 may include a control unit 44, a storage device 45, and a first interface 46. The control unit 44 includes at least one processor (CPU). The control unit 44 executes a program stored in the storage device 45. The storage device 45 includes a RAM, a ROM, and a storage. The first interface 46 is an interface circuit for data communication with the mounting unit 42.

The mounting unit 42 includes a second interface 47. The second interface 47 is an interface circuit for data communication with the information processing device 41. The first interface 46 and the second interface 47 perform wired communication or radio communication. For example, the first interface 46 transmits video data and a control signal supplied by the information processing device 41 to the second interface 47. In addition, the second interface 47 transmits various types of information to the first interface 46.

The mounting unit 42 is attached to the head of the user. The mounting unit 42 includes a video display unit 48 and a motion sensor 49. The video display unit 48 is an organic EL display panel or a liquid crystal display panel. The mounting unit 42 (video display unit 48) forms an image in front of the right and left eyes of the wearer, and displays a stereoscopic virtual reality video using binocular parallax. The video display unit 48 displays a video based on the video data supplied from the information processing device 41. The video display unit 48 displays a video for the left eye and a video for the right eye. As a result, the video for the left eye is incident on the left eye of the wearer. The video for the right eye is incident on the right eye of the wearer.

Note that the video display unit 48 may be a retinal irradiation type display element that directly projects a video on the retina of the user.

The mounting unit 42 may include a plurality of cameras as the detector 43. That is, the detector 35 may be the same device as the virtual reality video display device 4. Since the detector is integrated with the virtual reality video display device 4, the configuration of the virtual reality video display device 4 is simplified. For example, the cameras are disposed in the left-right direction. Furthermore, the camera may be provided outside the mounting unit 42. As illustrated in FIG. 5, the detector 43 (camera) may be provided on a wall of a room. Imaging data obtained by photographing by each camera may be transmitted to the information processing device 41. The information processing device 41 may calculate the positions of the mounting unit 42 and the input device 1, and the distance from the input device 1 to the mounting unit 42 based on the parallax of the input device 1 appearing in the imaging data obtained by photographing by each camera. Note that the detector 43 may be a device other than the camera, such as an infrared sensor. For example, the detector 43 may be a LiDAR or a ToF sensor (an infrared laser beam and a camera). The motion sensor 49 is a sensor that measures the inclination, direction, and movement of the head (mounting unit 42) of the wearer.

The information processing device 41 virtually arranges a virtual object (object) and a left-eye viewpoint camera and a right-eye viewpoint camera in a virtual space. The information processing device 41 generates data of a video when viewing the virtual space from the left-eye viewpoint camera as data of a video for the left eye. Furthermore, it generates data of a video when viewing the virtual space from the right-eye viewpoint camera as data of a video for the right eye. When the virtual object is disposed in the virtual space, the virtual object appears to exist in the virtual reality video displayed in the field of view of the wearer. For example, when the virtual object is a desk, it appears that the desk exists. Furthermore, the information processing device 41 can arrange the input device 1 in the virtual space based on the position (coordinates) of the input device 1 recognized using the imaging data obtained by photographing by the plurality of detectors 43 (cameras). Furthermore, the information processing device 41 can arrange the input device 1 in the data of a video for the left eye and the data of a video for the right eye. As a result, the input device 1 is displayed as the virtual reality video.

Furthermore, the information processing device 41 may communicate with the communication circuit unit 16 of the input device 1. For example, the communication circuit unit 16 of the input device 1 may transmit the output value of the movement sensor to the information processing device 34. The information processing device 41 may move the position (coordinates) of the input device 1 in the virtual space in accordance with the movement of the input device 1 in the real space.

The input device 1 can be set using the computer 200 (see FIG. 1). In the stereoscopic video display input system 30, the computer 200 may be the information processing device 34. In the virtual reality video display input system 40, the computer 200 may be the information processing device 41. The input device 1 may be set using the computer 200 other than the information processing device 34 and the information processing device 41.

Using the computer 200, it is possible to select a type of the stereoscopic display object 5, which is classified by the characteristic of the real object for the stereoscopic display object 5, or a type (type of display object, material) of the virtual object, which is classified by the characteristic of the real object for the virtual object. For example, the type of the display object can be selected from predetermined candidates. For example, the type such as ceramic, glass, rubber, ice, stone, or wood may be selected. In addition, the type may be selectable from a plurality of kinds of metals such as iron and aluminum. In addition, the type may be selectable from a plurality of kinds of fabrics such as silk and cotton. In addition, the type may be selectable from a plurality of kinds of paper such as plain paper, Japanese paper, and cardboard. Further, the type may be selected from a plurality of kinds of resins. In addition, the type may be selectable from names of objects such as notes and books. The computer 200 transmits data indicating the type of display object selected by the operator to the communication circuit unit 16. The communication circuit unit 16 of the input device 1 receives data indicating the type of the selected display object. In this way, the type of the object displayed having no substance can be set.

Further, the computer 200 can be used to select whether the input device 1 is regarded as a finger or what kind of tool the input device 1 is regarded as (handled as). The kind of a finger or a tool can be selected from the predetermined candidates. The kind of the finger may be selected from a plurality of kinds. As the kind of the finger, a finger on which a wearable device is worn may be selected. As the kind of finger, a finger around which a tape is wound may be selected. A finger may be selected from five fingers such as a thumb, an index finger, a middle finger, a ring finger, and a little finger. Note that only one kind of the finger may be selectable. In addition, a tool may be selected from a plurality of writing instruments such as a brush, a pen, a pencil, and a crayon. A tool such as scissors or a cutter may be selectable. The computer 200 transmits data indicating the kind of the finger or the tool selected by the operator to the communication circuit unit 16. The communication circuit unit 16 of the input device 1 receives data indicating the kind of the finger or the tool selected. In this manner, the kind of the finger or the tool to be input (operated) to the display object can be set. In other words, it is possible to perform setting so as to cause the input device 1 to reproduce a tactile sensation in which what kind of finger is brought into contact with the real object for the display object can be recognized, or to cause the input device 1 to reproduce a tactile sensation in which what kind of tool is brought into contact with the real object for the display object can be recognized.

Figure 8:
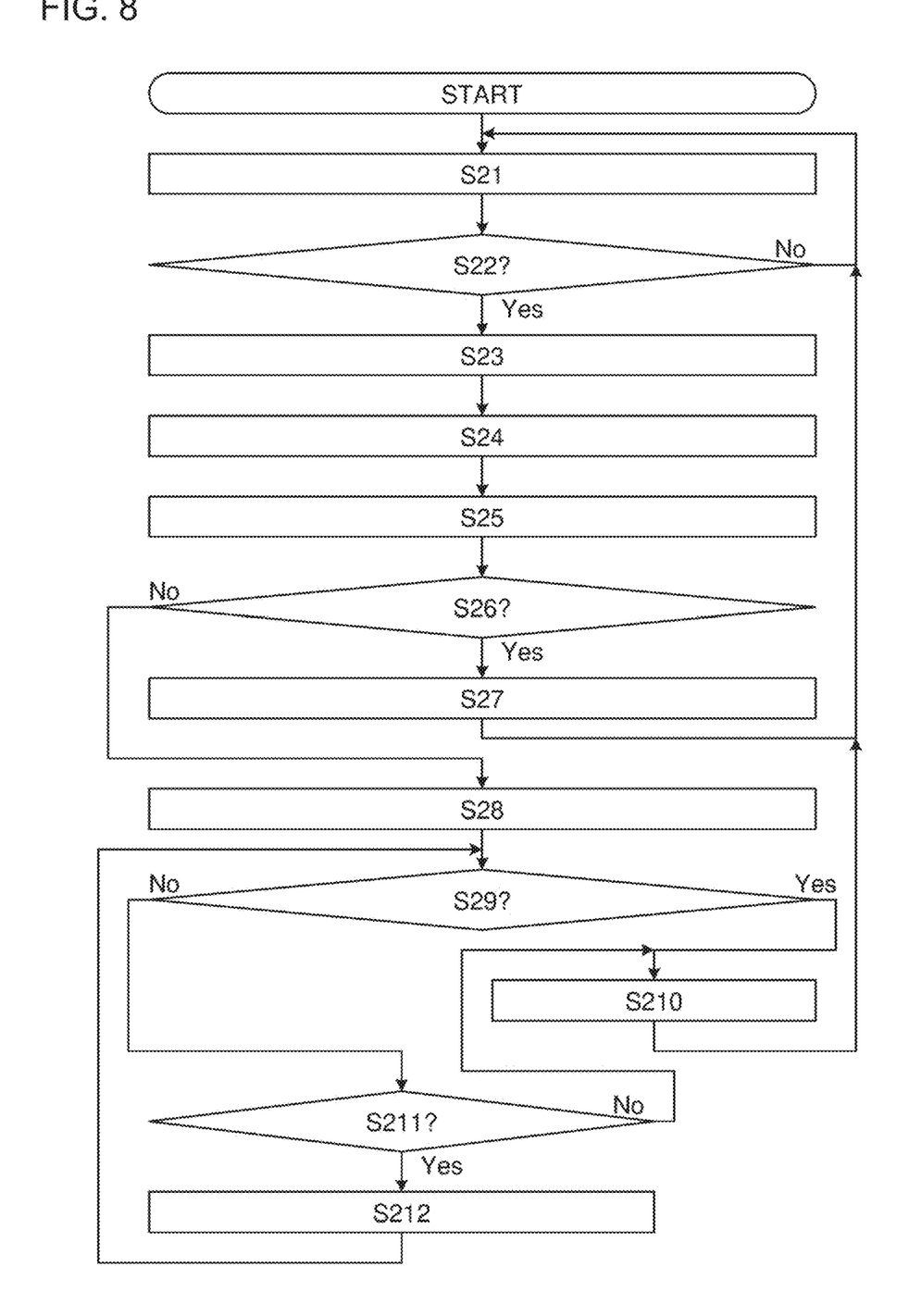
FIG. 8 is a diagram illustrating an example of a flow of operation of the input device according to an example embodiment of the present disclosure.

FIG. 8 is a diagram illustrating an example of a flow of operation of the input device 1 according to the example embodiment. First, in the input device 1 used for inputting to the display object, the storage 15 stores the vibration pattern data D1. That is, the storage 15 of the input device 1 stores the magnitude of vibration according to the relative position between the stereoscopic display object 5 and the input device 1 or the relative position between the input device 1 and the virtual object in the virtual reality space. In other words, the storage 15 stores data (vibration pattern data D1) defining the magnitude of vibration according to the relative position between the stereoscopic display object 5 and the input device 1 or the magnitude of vibration according to the relative position between the input device 1 and the virtual object in the virtual reality space. Then, the magnitude of the vibration of the vibrator 11 changes according to the relative position between the stereoscopic display object 5 and the input device 1 or the relative position between the virtual object and the input device 1 in the virtual reality space based on the data stored in the storage 15. That is, the vibration controller 14 refers to the vibration pattern data D1 and vibrates the vibrator 11 with a magnitude corresponding to the relative position between the display object and the input device 1. As a result, when the input device 1 is moved (input operation is performed), the magnitude of the vibration can be determined based on the data in the storage 15. In addition, the tactile sensation in accordance with the movement of the input device 1 is provided to the operator. That is, the vibration in accordance with the content of the motion of the input device 1 is given to the operator.

The vibration pattern data D1 may be data indicating a pattern of vibration generated in the vibrator 11 for a predetermined time. The storage 15 stores the vibration pattern data D1 for each combination of the type of the display object and the kind of the finger or the tool. This is the same as the way of the input device 1 described in the first usage example. The controller 17 reads, from the storage 15, the vibration pattern data D1 corresponding to the finger or the tool selected and the display object. The driver circuit 18 may vibrate the vibrator 11 so that the vibration of the read vibration pattern data D1 is reproduced. In this case, the driver circuit 18 reproduces the vibration pattern included in the vibration pattern data D1. For example, the driver circuit 18 varies the interval, frequency, and amplitude of the vibration generated by the vibrator 11 for each combination of the finger or the tool and the type of the display object.

The vibration pattern data D1 may be data defining a pattern (waveform) of the drive signal S1 for a predetermined time. Parameters of the pattern (waveform) include an amplitude, a frequency, an ON time, and an OFF time. The storage 15 may store patterns of the different drive signals S1 for each combination of the type of the display object and the kind of the finger or the tool. For example, the pattern of the drive signal S1 is determined, in advance, so as to approximate the vibration received by the hand when the selected display object is traced with the finger or the tool selected. For example, the amplitude of the drive signal S1, the timing of turning ON/OFF the voltage to the vibrator 11, the pulse width of the voltage application of the vibrator 11, and the like may be determined, in advance, for each combination of the type of the display object and the kind of the finger or the tool. The controller 17 of the vibration controller reads, from the storage 15, the vibration pattern data D1 corresponding to the finger or the tool selected and the selected display object. The driver circuit 18 generates a drive signal S1 based on the read vibration pattern data D1. The vibration received by the hand when a real object for the selected display object is traced with the finger or the tool selected can be reproduced.

Furthermore, in the combination of the one finger or one tool and the type of the display object, different vibration pattern data D1 may be determined for each level (stage) of the magnitude (strength) of vibration. The vibration pattern data D1 is determined such that the vibration is larger as the level is higher (larger). That is, a plurality of pieces of vibration pattern data D1 may be determined according to the level of the magnitude of vibration in a combination of one finger or one tool and the type of the display object. For example, when the magnitude of vibration has 10 levels, 10 kinds of vibration pattern data D1 may be determined in a combination of one finger or one tool and the type of display object. The number of levels may be larger or smaller than 10 levels.

The start of FIG. 8 is a time point when the operation of the input device 1 is started. The input device 1 may be provided with a switch for performing ON/OFF. In addition, the computer 200 may be operated to switch ON/OFF of the input device 1.

First, controller 17 recognizes a positional relationship between the input device 1 and the display object (step S21). In the case of the stereoscopic video display input system 30, the controller 17 recognizes the positional relationship between the stereoscopic display object 5 (display object) and the input device 1 in the real space. For example, the information processing device 34 recognizes the position (coordinates) of the input device 1 and the position (coordinates) of the stereoscopic display object 5 in the real space based on the imaging data output from the detector (camera). The information processing device 34 may recognize the position of the input device 1 using the output of the position sensor. For example, the coordinates are three-dimensional, and the input device 1 and the stereoscopic display object 5 occupy a certain space. The information processing device 34 transmits the recognition result to the communication circuit unit 16 of the input device 1. Based on the data received by the communication circuit unit 16, the controller 17 recognizes the positional relationship between the input device 1 and the stereoscopic display object 5 in the real space. The information processing device 34 periodically transmits data indicating the position (coordinates) of the input device 1 and the position (coordinates) of the stereoscopic display object 5.

In the case of the virtual reality video display input system 40, the positional relationship between the virtual object and the input device 1 in the virtual space is recognized. For example, the information processing device 41 may recognize the position of the input device 1 based on imaging data output from the detector (camera). The information processing device 41 may recognize the position of the input device 1 using the output of the position sensor. Then, based on the position of the recognized input device 1, the information processing device 41 allocates a position (coordinates) in the virtual space to the input device 1. The information processing device 41 also allocates a position (coordinates) to the virtual object (display object) in the virtual space. For example, the coordinates of the input device 1 and the virtual object are three-dimensional. The input device 1 and the virtual object occupy a certain space in the virtual space. The information processing device 41 transmits the recognition result to the communication circuit unit 16 of the input device 1. Based on the data received by the communication circuit unit 16, the controller 17 recognizes the positional relationship between the input device 1 and the virtual object in the virtual space. The information processing device 41 periodically transmits data indicating the position (coordinates) of the input device 1 and the position (coordinates) of the virtual object in the virtual space.

Then, based on the recognized positional relationship, the controller 17 determines whether the display object and the input device 1 are in contact with each other (step S22). In the case of the stereoscopic video display input system 30, when the position (coordinates) of the input device 1 and the position (coordinates) of the stereoscopic display object 5 overlap, the controller 17 may determine that the stereoscopic display object 5 and the input device 1 are in contact with each other in the real space. When the position (coordinates) of the input device 1 and the position (coordinates) of the stereoscopic display object do not overlap, the controller 17 determines that the stereoscopic display object 5 and the input device 1 are not in contact with each other in the real space.

In the case of the virtual reality video display input system 40, when the position (coordinates) of the input device 1 and the position (coordinates) of the virtual object overlap in the virtual space, the controller 17 may determine that the virtual object and the input device 1 are in contact with each other. In addition, when the position (coordinates) of the input device 1 and the position (coordinates) of the virtual object do not overlap in the virtual space, the controller 17 may determine that the virtual object and the input device 1 are not in contact with each other.

When it is determined that the display object and the input device 1 are not in contact with each other in the real space or the virtual space (No in step S22), the controller 17 executes step S11 again. On the other hand, when it is determined that the display object and the input device 1 are in contact with each other in the real space or the virtual space (Yes in step 22), the controller 17 obtains the level of the depth of contact of the input device 1 with the display object (step S23).

In the case of the stereoscopic video display input system 30, for example, the controller 17 may obtain the volume of the portion of the input device 1 overlapping the stereoscopic display object 5 based on the coordinates of the stereoscopic display object 5 and the coordinates of the input device 1. The controller 17 may determine that the input device 1 is in deeper contact with the display object as the obtained volume is larger. For example, the range of the volume is predetermined for each level of the depth of contact. The controller 17 may obtain the level of the contact depth of the input device 1 based on the obtained volume.

Furthermore, in the case of the virtual reality video display input system 40, for example, the controller 17 may obtain the volume of the portion of the input device 1 overlapping the virtual object based on the coordinates of the virtual object in the virtual space and the coordinates of the input device 1. The controller 17 may determine that the input device 1 is in deeper contact with the display object as the obtained volume is larger. The controller 17 may obtain the level of the contact depth of the input device 1 based on the obtained volume.

Based on the level of the contact depth, the controller 17 determines the level of the intensity of vibration (step S24). In the present example embodiment, the level of the intensity of vibration corresponding to the level of the depth of contact is determined, in advance. The controller 17 selects a level at which the vibration is larger as the contact is deeper. Then, the controller 17 selects the vibration pattern data D1 with the vibration level selected corresponding to the finger or the tool selected and the display object (step S25).

Next, the controller 17 determines whether the input device 1 is stationary based on the output of the movement sensor (step S26). For example, when the movement amount of the movement sensor 19 per unit time is equal to or less than a threshold value, the controller 17 determines that the input device 1 is stationary. When the movement amount of the movement sensor 19 per unit time exceeds the threshold value, the controller 17 determines that the input device 1 is not stationary.

When it is determined that the input device 1 is stationary (Yes in step S26), the controller 17 and the driver circuit 18 do not vibrate the vibrator 11 (step S27). Then, the flow returns to step S21. In the input device 1 and the display input system, the input device 1 includes the movement sensor 19 that detects the movement of the input device 1. Then, the vibrator 11 may be prevented from vibrating while the input device 1 is stationary. As a result, the input device 1 does not vibrate when the input device 1 is not moved. While the operator stops the operation, the vibration also stops. For example, in a state where a line is not drawn using the input device 1, the vibration stops.

On the other hand, when determining that the input device 1 is moving (No in step S26), the controller 17 and the driver circuit 18 vibrate the vibrator 11 based on the read vibration pattern data D1 (step S28). As a result, the vibrator 11 generates a larger vibration as the relative position between the display object and the input device 1 is closer. That is, in the input device 1 and the display input system, a vibration of the vibrator 11 when the relative position between the stereoscopic display object 5 displayed as the stereoscopic video in the real space and the input device 1 is close or when the relative position between the virtual object and the input device 1 in the virtual reality space is close is larger than that when the relative position between the stereoscopic display object 5 and the input device 1 in the real space is far or when the relative position between the virtual object and the input device 1 in the virtual reality space is far, whereby the strength of the vibration of the vibrator 11 is increased or decreased according to the difference (distance) in position between the input device 1 and the stereoscopic display object 5 displayed as the stereoscopic video. Furthermore, the strength of the vibration of the vibrator 11 is increased or decreased according to a difference (distance) between the position of the input device 1 and the position of the virtual reality image in the virtual space. Therefore, it is possible to provide a different tactile sensation to the operator according to the positions (distance) of the input device 1 and the object. It is possible to provide the input device 1 that not only simply vibrates but also provides various tactile sensations depending on the way of handling.

Here, even when the relative position and the finger or the tool selected are the same, the vibration pattern data D1 varies depending on the type of the selected display object. Therefore, the vibration of the vibrator 11 varies depending on a type of the stereoscopic display object 5, which is classified by a characteristic of a real object for the stereoscopic display object 5, or a type of the virtual object, which is classified by a characteristic of a real object for the virtual object. Furthermore, the input device 1 includes a selection receiver that receives selection of the type of the stereoscopic display object 5 or the type of the virtual object. The selection receiver is, for example, the communication circuit unit 16. The vibration controller 14 causes the vibrator 11 to vibrate differently according to the type of the selected display object. That is, the vibration of the vibrator 11 varies depending on the selected type. Thus, the vibration pattern can be changed according to an actual type and a material of the display object. For example, the manner of the vibration of the input device 1 varies between when the display object is cloth and when the display object is paper. Therefore, the vibration in accordance with the material of the real object for the display object can be generated. Moreover, the operator of the input device 1 can select the actual type of the display object. Therefore, it is possible to reproduce the vibration when contacting the real object for the display object. That is, it is possible to obtain a tactile sensation similar to that when the real object for the display object is traced.

For example, when the stereoscopic display object 5 is a tablet terminal, the input device 1 (vibrator 11) may generate a vibration that reproduces a vibration when tracing glass. Furthermore, in a case where the virtual object is paper, the input device 1 (vibrator 11) may generate a vibration that reproduces a vibration when tracing the paper.

For example, the frequency of the vibration of the vibrator 11 may vary depending on the type of the display object selected. The vibration pattern data D1 may be data having a different vibration frequency depending on the type of the selected display object. The frequency of the vibration when tracing an object having a smooth surface is lower than the frequency of the vibration when tracing an object having a rough surface. The frequency of the vibration of the input device 1 changes according to the smoothness of the surface of the real object for the display object.

Furthermore, even when the relative position and the type of the selected display object are the same, the vibration pattern data D1 varies depending on the kind of the finger or the kind of the tool selected. Therefore, the vibration of the vibrator 11 varies depending on the kind of the finger or the tool. Furthermore, the selection receiver of the input device 1 receives selection of the kind of the finger or the tool. The selection receiver is, for example, the communication circuit unit 16. The vibration controller 14 causes the vibrator 11 to vibrate differently according to the kind of the finger or the tool selected. That is, the vibration of the vibrator 11 varies depending on the kind of the finger or the tool selected. As a result, the vibration according to the kind of the finger or the tool can be generated. Therefore, when the input device 1 is used, it is possible to obtain a tactile sensation as if the real object for the display object is traced with a finger or a tool. Moreover, the operator of the input device 1 can select what finger or what tool the input device 1 is regarded as. Then, with the vibration of the input device 1, it is possible to obtain a tactile sensation as if the selected finger or tool is used. For example, when the input device 1 is regarded as a cutter, the input device 1 (vibrator 11) may generate a vibration that reproduces the vibration when the real object for the display object is traced with the cutter.

After the start of the vibration, the controller 17 determines whether the input device 1 is stationary based on the output of the movement sensor 19 (step S29). When it is determined that the input device 1 is stationary (Yes in step S29), the controller 17 and the driver circuit 18 stop the vibration of the vibrator 11 (step S210). Then, the controller 17 performs step S21 (returns to step S21).

When input device 1 is not stationary (moving) (No in step S29), controller 17 determines whether the display object and input device 1 are in contact with each other as in step S22 (step S211). When it is determined that the stereoscopic display object 5 and the input device 1 are not in contact with each other in the real space or the virtual object and the input device 1 are not in contact with each other in the virtual space (No in step S211), the controller 17 and the driver circuit 18 stop the vibration of the vibrator 11 (step S210). Then, the controller 17 performs step S21 (returns to step S21). When it is determined that the display object and the input device 1 are in contact with each other (Yes in step S211), the controller 17 and the driver circuit 18 continue the vibration of the vibrator 11 (step S212). Then, the controller 17 performs the process of step S29.

In the display input system, the input device 1 includes the movement sensor 19 that detects the movement of the input device 1. Then, the vibrator 11 may keep the frequency of the vibration constant even when the moving speed changes during the movement of the input device 1. In other words, the vibration controller 14 may vibrate the vibrator 11 at a constant frequency even when the moving speed changes during the movement of the input device 1. Vibration control of the input device 1 is facilitated. The vibration controller

14 may not be a complicated circuit. A tactile effect can be obtained even with a simple configuration.

Furthermore, in the display input system, when the relative position between the stereoscopic display object 5 and the input device 1 or the relative position between the virtual object and the input device 1 in the virtual space changes while the input device 1 moves and the vibrator 11 vibrates, the vibrator 11 may change the magnitude (stage) of vibration. The vibration controller 14 may change the magnitude of the vibration of the vibrator 11 when recognizing a change in the relative position between the input device 1 and the video. For example, the controller 17 selects new vibration pattern data D1 based on the level of the contact depth after the change.

The present disclosure can be used for an input device and a display input system including the input device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An input device, comprising:
a contact body to contact an object;
a pressure sensor to detect a pressure of contact of the contact body with the object;
a vibrator to generate a vibration to provide a tactile sensation; and
a vibration controller to input a drive signal to the vibrator to operate the vibrator; wherein
a vibration of the vibrator when a pressure detected based on an output of the pressure sensor is large is larger than a vibration of the vibrator when a pressure detected based on an output of the pressure sensor is small;
the input device further comprises a selection receiver to receive selection of a kind of a finger or a tool;
the vibration of the vibrator varies depending on the line of the finger or the tool selected; and
a driver circuit of the vibrator varies an interval and frequency of the vibration generated by the vibrator for each combination of the kind of the finger or the tool and a type of the object.

2. The input device according to claim 1, further comprising:
a storage to store a magnitude of a vibration when the contact body and the object come into contact with each other; wherein
the magnitude of the vibration of the vibrator changes according to an output value of the pressure sensor based on data stored in the storage.

3. The input device according to claim 1, wherein the vibration of the vibrator varies depending on a type of the object classified by a characteristic of the object.

4. The input device according to claim 3, further comprising:
a selection receiver to receive selection of the type of the object; wherein
the vibration of the vibrator varies depending on the type of the object selected.

5. The input device according to claim 4, wherein a frequency of the vibration of the vibrator varies depending on the type of the object selected.

6. The input device according to claim 1, further comprising:
a movement sensor to detect a movement of the input device; wherein
the vibrator does not vibrate while the input device is stationary.

7. The input device according to claim 1, further comprising:
a movement sensor to detect a movement of the input device; wherein
the vibrator keeps a frequency of a vibration constant even when a moving speed changes during the movement of the input device.

8. An input device comprising:
a vibrator to generate a vibration to provide a tactile sensation; and
a vibration controller to input a drive signal to the vibrator to operate the vibrator; wherein
a vibration of the vibrator when a relative position between a stereoscopic display object displayed as a stereoscopic video in a real space and an input device is close, or when a relative position between a virtual object and an input device in a virtual reality space is close is larger than a vibration of the vibrator when a relative position between the stereoscopic display object and the input device is far, or when a relative position between the virtual object and the input device in the virtual reality space is far;
the input device further comprises a selection receiver to receive selection of a kind of a finger or a tool;
the vibration of the vibrator varies depending on the kind of the finger or the tool selected; and
a driver circuit of the vibrator varies an interval and frequency of the vibration generated by the vibrator for each combination of the kind of the finger or the tool and a type of the object.

9. The input device according to claim 8, further comprising:
a storage to store a magnitude of a vibration according to a position relative to the stereoscopic display object or a position relative to the virtual object in the virtual reality space; wherein
a magnitude of the vibration of the vibrator changes according to a position relative to the stereoscopic display object or a position relative to the virtual object in the virtual reality space, based on data stored in the storage.

10. The input device according to claim 8, wherein the vibration of the vibrator varies depending on a type of the stereoscopic display object classified by a characteristic of a real object for the stereoscopic display object, or a type of the virtual object classified by a characteristic of a real object for the virtual object.

11. The input device according to claim 10, further comprising:
a selection receiver to receive selection of the type of the stereoscopic display object or the type of the virtual object; wherein
the vibration of the vibrator varies depending on a type selected.

12. The input device according to claim 11, wherein a frequency of the vibration of the vibrator varies depending on a type selected.

13. The input device according to claim 8, further comprising:
a movement sensor to detect a movement of the input device; wherein the vibrator does not vibrate while the input device is stationary.

14. The input device according to claim 8, further comprising:
a movement sensor to detect a movement of the input device; wherein
the vibrator keeps a frequency of a vibration constant even when a moving speed changes during the movement of the input device.

15. A display input system comprising:
a display device to display a stereoscopic video or a virtual reality video;
an input device; and
a detector to detect a position of the input device; wherein
the input device includes a vibrator to generate a vibration to provide a tactile sensation, a vibration controller to input a drive signal to the vibrator to operate the vibrator;
a vibration of the vibrator when a relative position between a stereoscopic display object displayed as the stereoscopic video in a real space and the input device is close, or when a relative position between a virtual object and the input device in a virtual reality space is close is larger than a vibration of the vibrator when a relative position between the stereoscopic display object and the input device is far, or when a relative position between the virtual object and the input device in the virtual reality space is far;
the input device includes a selection receiver to receive selection of a kind of a finger or a tool;
the vibration of the vibrator varies depending on the kind of the finger or the tool selected; and
a driver circuit of the vibrator varies an interval and frequency of the vibration generated by the vibrator for each combination of the kind of the finger or the tool and a type of the object.

16. The display input system according to claim 15, further comprising:
a storage to store a magnitude of a vibration according to a relative position between the stereoscopic display object and the input device or a relative position between the virtual object and the input device in the virtual reality space; wherein
a magnitude of a vibration of the vibrator changes according to a relative position between the stereoscopic display object and the input device or a relative position between the virtual object and the input device in the virtual reality space, based on data stored in the storage.

17. The display input system according to claim 15, wherein the vibration of the vibrator varies depending on a type of the stereoscopic display object, which is classified by a characteristic of a real object for the stereoscopic display object, or a type of the virtual object, which is classified by a characteristic of a real object for the virtual object.

18. The display input system according to claim 17, further comprising:
a selection receiver to receive selection of the type of the stereoscopic display object or the type of the virtual object; wherein
the vibration of the vibrator varies depending on a type selected.

19. The display input system according to claim 18, wherein a frequency of the vibration of the vibrator varies depending on a type selected.

20. The display input system according to claim 15, wherein
the input device includes a movement sensor to detect a movement of the input device; and
the vibrator does not vibrate while the input device is stationary.

21. The display input system according to claim 15, wherein
the input device includes a movement sensor to detect a movement of the input device; and
the vibrator keeps a frequency of a vibration constant even when a moving speed changes during the movement of the input device.

22. The display input system according to claim 15, wherein the detector is the same device as the display device.

* * * * *